United States Patent
Matsubara (10) Patent No.: US 11,310,390 B2
(45) Date of Patent: Apr. 19, 2022

(54) INFORMATION PROCESSING APPARATUS, INFORMATION PROCESSING METHOD, AND NON-TRANSITORY RECORDING MEDIUM

(71) Applicant: Kazuki Matsubara, Kanagawa (JP)

(72) Inventor: Kazuki Matsubara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/394,484

(22) Filed: Aug. 5, 2021

(65) Prior Publication Data
US 2022/0060600 A1 Feb. 24, 2022

(30) Foreign Application Priority Data
Aug. 19, 2020 (JP) .............................. JP2020-138833

(51) Int. Cl.
*H04N 1/32* (2006.01)

(52) U.S. Cl.
CPC ..... *H04N 1/32379* (2013.01); *H04N 1/32454* (2013.01); *H04N 1/32486* (2013.01)

(58) Field of Classification Search
None
See application file for complete search history.

(56) References Cited

U.S. PATENT DOCUMENTS

| 2011/0258540 A1* | 10/2011 | Ueda | G06F 16/168 |
| | | | 715/273 |
| 2013/0050730 A1* | 2/2013 | Soga | H04N 1/32106 |
| | | | 358/1.13 |

FOREIGN PATENT DOCUMENTS

| JP | 2005-184399 | 7/2005 |
| JP | 2005-323105 | 11/2005 |
| JP | 2009-017482 | 1/2009 |
| JP | 2014-192621 | 10/2014 |

* cited by examiner

*Primary Examiner* — Lennin R Rodriguezgonzalez
(74) *Attorney, Agent, or Firm* — Xsensus LLP (57) ABSTRACT

An information processing apparatus includes circuitry to, store, in a memory, received fax data as a stored document in a distribution destination folder corresponding to the fax data, in response to detection of a delete operation performed on the stored document, determine a state of the stored document to generate a first determination result, when the first determination result indicates that the stored document is in a read state, determine whether a period from a time at which the stored document was read to a time at which the delete operation was performed is within a preset period to generate a second determination result, and when the first determination result indicates that the stored document is in an unread state, or when the second determination result indicates that the period is within the preset period, copy the stored document to a specific folder and delete the stored document.

8 Claims, 9 Drawing Sheets

```
┌─────────────────────────────────────────────────────────────┐ 1100
│ [COPY] [SCAN] [FAX]        DEVICE ADMINISTRATOR      ☾     │
├─────────────────────────────────────────────────────────────┤
│ [←] FOLDER SELECT            [🔍 SEARCH]  [⟲ RESET]          │
│  ┌──────────────────────────────────────┐  ┌──────────┐     │
│  │ MONTH AND DAY  ▼  ↓□                 │  │ PREVIEW  │ 1111│
│  ├──────────────────────────────────────┤  ├──────────┤     │
│  │ 📁 INITIAL RECEPTION   NUMBER OF UNREAD│ │ TRANSFER │ 1112│
│1101│    FOLDER              DOCUMENTS [00]│ ├──────────┤     │
│  ├──────────────────────────────────────┤  │  PRINT   │ 1113│
│  │ 002 📁 COMPANY A  CREATED DATE  NUMBER │ ├──────────┤     │
│  │                   AND TIME     OF UNREAD│ │  DELETE  │1114│
│  │                   11/21 09:00 DOCUMENTS│ └──────────┘     │
│  │                                    [00]│                  │
│  ├──────────────────────────────────────┤                    │
│  │ 003 📁 COMPANY B  CREATED DATE  NUMBER │                  │
│  │                   AND TIME     OF UNREAD                  │
│  │                   11/21 10:00 DOCUMENTS                   │
│  │                                    [00]│                  │
│  ├──────────────────────────────────────┤                    │
│  │ 004 📁 COMPANY C  CREATED DATE  NUMBER │                  │
│  │                   AND TIME     OF UNREAD                  │
│  │                   11/21 11:00 DOCUMENTS                   │
│  │                                    [00]│                  │
│  ├──────────────────────────────────────┤                    │
│  │ 005 📁 COMPANY D  CREATED DATE  NUMBER │                  │
│  │                   AND TIME     OF UNREAD                  │
│  │                   11/21 12:00 DOCUMENTS                   │
│  │                                    [00]│                  │
│  ├──────────────────────────────────────┤                    │
│  │ 005 📁 COMPANY E  CREATED DATE  NUMBER │                  │
│  │                   AND TIME     OF UNREAD                  │
│  │                                DOCUMENTS                  │
│ CHECK STATUS  2018/06/21  ↺   🏠   ≡       ⊙ STOP           │
│               19:36                                          │
└─────────────────────────────────────────────────────────────┘
```

FIG. 9

```
┌─────────────────────────────────────────────────────────────┐
│ <XXXX (MODEL NAME)-YYY (DEVICE NUMBER)>                     │
│ STORED DOCUMENT COPY NOTIFICATION                           │
├─────────────────────────────────────────────────────────────┤
│ IT IS NOTIFIED THAT STORED DOCUMENT HAS BEEN COPIED         │
│ TO ADMINISTRATOR FOLDER.                                    │
│ PLEASE CONFIRM FOLLOWING INFORMATION AND TAKE               │
│ MEASURE IF THERE IS ANY PROBLEM.                            │
│ -----------------------------------------------------       │
│ COPY DOCUMENT INFORMATION: AAAA                             │
│ OPERATING USER: BBBB                                        │
│ DOCUMENT STATE: DELETED IMMEDIATELY AFTER BEING READ        │
│ DOCUMENT DELETED DATE AND TIME  : 2020/05/20 09:34:15       │
│ DOCUMENT READ DATE AND TIME     : 2020/05/20 09:30:54       │
│ DOCUMENT STORED DATE AND TIME   : 2020/05/19 10:45:32       │
│ -----------------------------------------------------       │
└─────────────────────────────────────────────────────────────┘
```

FIG. 10

DATA MANAGEMENT TABLE

| TRANSMISSION NUMBER | SENDER | RECEIVED DATE AND TIME | RECEIVED DATA STORAGE DESTINATION | READ/UNREAD | DELETED | ADMINISTRATOR NOTIFICATION |
|---|---|---|---|---|---|---|
| 03-xxxx-1001 | COMPANY A | 2020/05/22 | <PATH>/20200522209000123.PDF | READ | TRUE | FALSE |
| 045-xxxx-1002 | COMPANY B | 2020/05/22 | <PATH>/20200522100000456.PDF | UNREAD | FALSE | FALSE |
| 03-xxxx-1001 | COMPANY A | 2020/05/22 | <PATH>/20200523150000789.PDF | UNREAD | TRUE | TRUE |
| ... | ... | ... | ... | ... | ... | ... |

FIG. 12

| | | | |
|---|---|---|---|
| COPY | SCAN | FAX | DEVICE ADMINISTRATOR |

← FOLDER SELECT  🔍 SEARCH  ✏ RESET

MONTH AND DAY ▼ ↓▯

| | | |
|---|---|---|
| | ▢ INITIAL RECEPTION FOLDER | NUMBER OF UNREAD DOCUMENTS [00] |
| | ▢ ADMINISTRATOR FOLDER | NUMBER OF UNREAD DOCUMENTS [00] |
| 002🔒 ▢ COMPANY A | CREATED DATE AND TIME 11/21 09:00 | NUMBER OF UNREAD DOCUMENTS [00] |
| 003🔒 ▢ COMPANY B | CREATED DATE AND TIME 11/21 10:00 | NUMBER OF UNREAD DOCUMENTS [00] |
| 004🔒 ▢ COMPANY C | CREATED DATE AND TIME 11/21 11:00 | NUMBER OF UNREAD DOCUMENTS [00] |
| 005🔒 ▢ COMPANY D | CREATED DATE AND TIME 11/21 10:00 | NUMBER OF UNREAD DOCUMENTS [00] |

Side buttons:
- PREVIEW — 1111
- TRANSFER — 1112
- PRINT — 1113
- DELETE — 1114
- DOCUMENT COPY HISTORY — 1115

CHECK STATUS  2018/06/21 19:36  ↶  🏠  ≡  ⊗ STOP 1100, 1101

INFORMATION PROCESSING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-138833, filed on Aug. 19, 2020, in the Japan Patent Office, the entire disclosure of which is hereby incorporated by reference herein.

BACKGROUND

Technical Field

The present disclosure relates to an information processing apparatus, an information processing method, and a non-transitory recording medium.

Description of the Related Art

The background multifunction peripheral (MFP) is often provided with a reception storage function for storing a fax-received document in a folder in the MFP to save paper. The reception storage function may have a folder distribution function for distributing the fax-received documents to each destination, for example, by providing different folders for respective transmission sources of fax data, received by a fax function (hereinafter, occasionally referred to as "folder distribution function").

With this folder distribution function, a password can be set for each folder, document can be easily managed without being monitored by an administrator, or a specific case can be easily managed for each folder.

As a technique for improving the efficiency of the storage management of the fax-received documents, a technique for simplifying the process of distributing the fax-received documents to the plurality of folders is disclosed.

In addition, as a technique for preventing deletion of an unprinted stored document, a technique is disclosed in which, after a fax-received document is stored, the document is copied to another storage area until a predetermined operation (printing or the like) is performed, and when an original document has been deleted at the time of power-on of an apparatus, the document is restored from the other storage area.

However, the technique of related art has a drawback that security is not improved, for example, against a delete operation by unauthorized use of the stored document.

SUMMARY

Example embodiments include an information processing apparatus including circuitry to store, in a memory, received fax data as a stored document in a distribution destination folder corresponding to the fax data, among one or more distribution destination folders created for respective one or more transmission sources, and in response to detection of a delete operation performed on the stored document, determine a state of the stored document to generate a first determination result. When the first determination result indicates that the stored document is in a read state, the circuitry determines whether a period from a time at which the stored document was read to a time at which the delete operation was performed is within a preset period to generate a second determination result. When the first determination result indicates that the stored document is in an unread state, or when the second determination result indicates that the period from the time at which the stored document was read to the time at which the delete operation was performed is within the preset period, the circuitry copies the stored document to a specific folder and delete the stored document.

Example embodiments include an information processing method, performed by the information processing apparatus.

Example embodiments include a program for executing the information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an image forming apparatus, an information processing apparatus, an information processing method, and a program according to embodiments of the present disclosure will be described in detail with reference to the accompanying drawings. The present disclosure, however, is not limited to the following embodiments, and the constituent elements of the following embodiments include those that can be easily conceived by those skilled in the art, those being substantially the same ones, and those being within equivalent ranges. Furthermore, various omissions, substitutions, changes, and combinations of the constituent elements can be made without departing from the gist of the following embodiments.

The computer software refers to a program related to the operation of a computer and other information provided for processing by the computer, and corresponds to the program (hereinafter, the computer software is referred to as "software"). The application software is a general term for any software (hereinafter simply referred to as "application") used to perform certain processing in the category of software. The operating system (hereinafter simply referred to as "OS") is software for controlling the computer, such that an application or the like is able to use computer resource. The OS provides basic management and control of the computer such as control of input or output of data, management of hardware such as a memory or a hard disk, or management of processes to be executed. The application operates using functions provided by the OS. The program is a set of instructions for causing the computer to perform processing to have a certain result. While data to be used in processing according to the program is not a program itself, such data may define processing to be performed by the program such that it may be interpreted as equivalent to the program. For example, a data structure, which is a logical structure of data described by an interrelation between data elements, may be interpreted as equivalent to the program.

Expected examples of the information processing apparatus that receives fax data from a transmission source apparatus include a MFP which is an example of an image forming apparatus, an ordinary fax receiver, and a personal computer (PC). The present embodiment is described based on the example of the MFP. The MFP represents an image forming apparatus having at least two functions of a copy function, a print function, a scan function, and a fax function.

Configuration of System in which MFP Receives Fax Data

Figure 1:
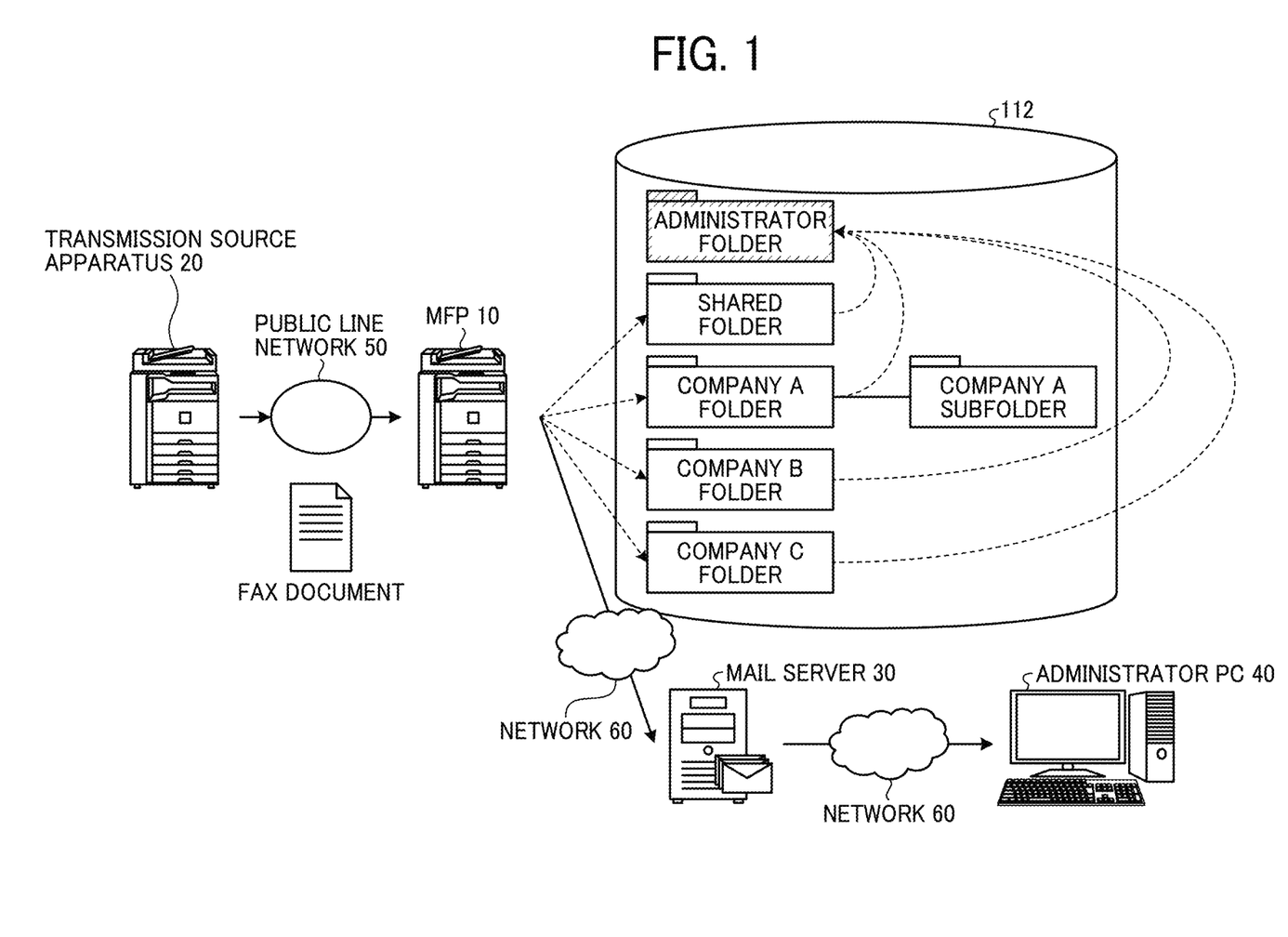
FIG. 1 is a diagram illustrating an example of a general arrangement of a system according to an embodiment.

FIG. 1 is a diagram illustrating an example of a general arrangement of a system according to an embodiment. Referring to FIG. 1, the general arrangement of the system will be described in which a MFP 10 according to the present embodiment receives fax data.

The MFP 10 illustrated in FIG. 1 is an image forming apparatus that receives fax data from a transmission source apparatus 20 via a public line network 50. The MFP 10 causes a storage unit 112 (described later) to distribute the received fax data into folders (distribution destination folders) set in advance as folders for storage of respective transmission sources and to store the distributed fax data. In this case, for example, the distribution destination folders may be set in a hierarchical structure such as "company A folder" and "company A subfolder" as illustrated in FIG. 1.

The transmission source apparatus 20 is a fax transmission apparatus that transmits fax data to the MFP 10 via the public line network 50, and is an apparatus owned by, for example, a customer of a company that owns the MFP 10. Expected examples of the transmission source apparatus 20 include a MFP, an ordinary fax receiver, and a PC. The transmission source apparatus 20 is an example of a transmission source of fax data received by the MFP 10, and there are other apparatuses that transmit fax data to the MFP 10.

A mail server 30 controls transmission and reception of emails between apparatuses in a network 60. In the example illustrated in FIG. 1, the mail server 30 relays the email transmitted from the MFP 10 and transfers the email to an administrator PC 40 that is a transmission destination of the email.

The administrator PC 40 receives, from the MFP 10, an email notifying that there is a possibility that a delete operation has been performed by unauthorized use of a stored document in the MFP 10 and the stored document has been copied to an administrator folder.

The public line network 50 is, for example, an analog line or a digital line such as an integrated services digital network (ISDN).

The network 60 is, for example, a data communication network such as a local area network (LAN), an intranet, or the Internet. Alternatively, the network 60 may include both a wired network and a wireless network.

Hardware Configuration of MFP

Figure 2:
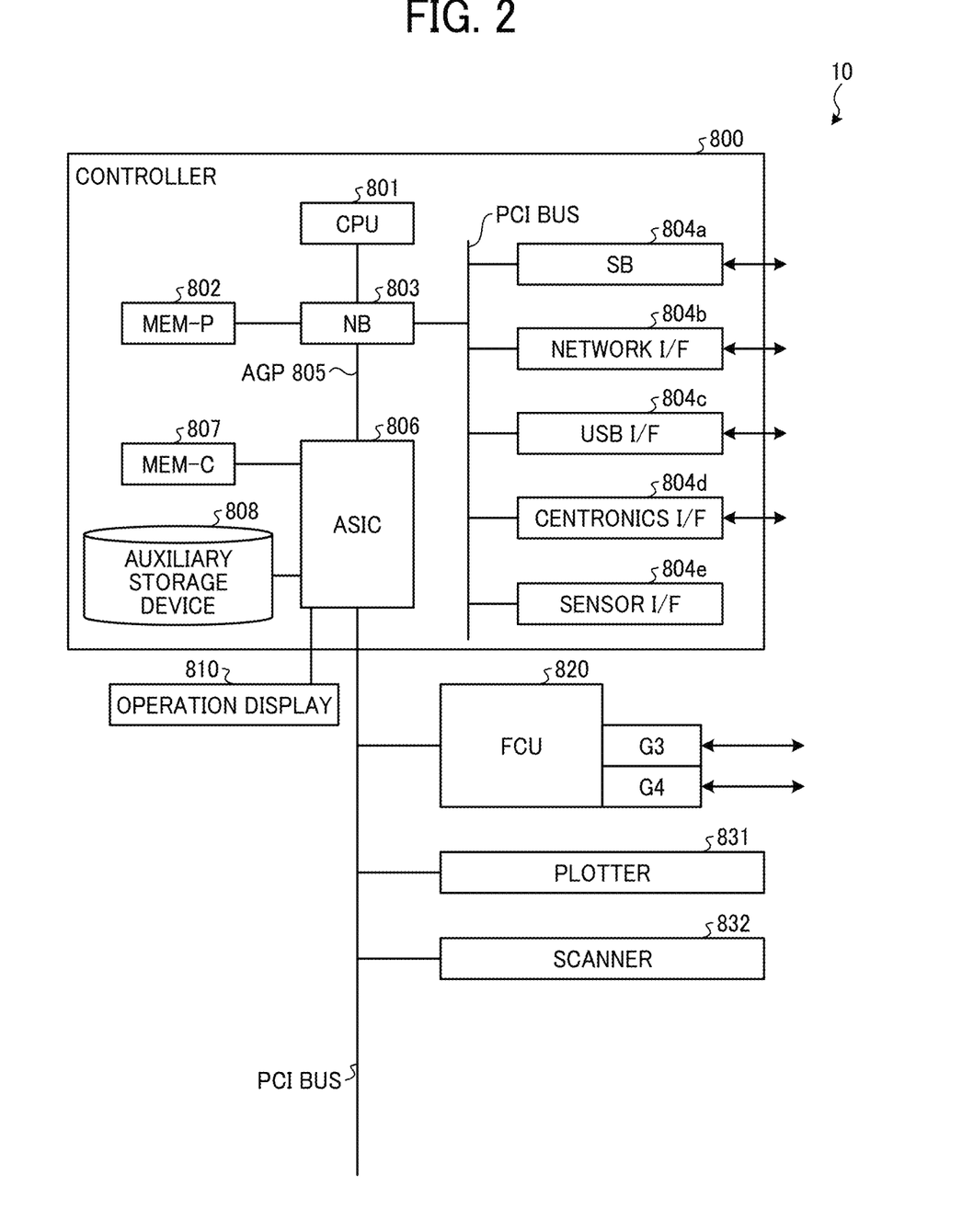
FIG. 2 is a block diagram illustrating an example of a hardware configuration of the MFP according to the embodiment.

FIG. 2 is a block diagram illustrating an example of a hardware configuration of the MFP 10 according to the embodiment. The hardware configuration of the MFP 10 according to the embodiment will be described with reference to FIG. 2.

As illustrated in FIG. 2, the MFP 10 includes a configuration in which a controller 800, an operation display 810, a facsimile control unit (FCU) 820, a plotter 831, and a scanner 832 are coupled via a peripheral component interface (PCI) bus.

The controller 800 is for, for example, control of the entire MFP 10, drawing, communication, and input from the operation display 810.

The operation display 810 is, for example, a touch panel, is a device that receives input to the controller 800 (input function), and displays the state of the MFP 10 or the like (display function). The operation display 810 is directly coupled to an application specific integrated circuit (ASIC) 806 (described later).

The FCU 820 is a device that implements a fax function, and is coupled to the ASIC 806 via, for example, the PCI bus.

The plotter 831 is a device that implements a print function, and is coupled to the ASIC 806 via, for example, the PCI bus. The scanner 832 has a function that implements a scan function, and is coupled to the ASIC 806 via, for example, the PCI bus.

The controller 800 includes a central processing unit (CPU) 801, a system memory (MEM-P) 802, a northbridge (NB) 803, a southbridge (SB) 804a, a network interface (I/F) 804b, a Universal Serial Bus (USB) I/F 804c, a Centronics I/F 804d, a sensor I/F 804e, the ASIC 806, a local memory (MEM-C) 807, and an auxiliary storage device 808.

The CPU 801 performs overall control of the MFP 10, and is coupled to a chip set including the MEM-P 802, the NB 803, and the SB 804a, and is coupled to other devices via the chip set.

The MEM-P 802 is a memory used as a memory to store programs and data, a memory to deploy programs and data, a memory for drawing in a printer, and the like, and includes a read-only memory (ROM) and a random access memory (RAM). The ROM is a read-only memory used as a memory to store programs and data. The RAM is a readable and writable memory used as, for example, a memory to deploy programs and data and a memory to store drawing data for a printer.

The NB 803 couples the CPU 801 with the MEM-P 802, the SB 804a, and an accelerated graphics port (AGP) bus 805, and includes a memory controller that controls reading or writing from or to the MEM-P 802, a peripheral component interconnect (PCI) master, and an AGP target.

The SB 804a couples the NB 803 with a PCI device and a peripheral device. The SB 804a is coupled to the NB 803 via a PCI bus. The network I/F 804b, the USB I/F 804c, the Centronics I/F 804d, the sensor I/F 804e, and so forth, are coupled to the PCI bus.

The AGP bus 805 is a bus interface for a graphics accelerator card that is devised for accelerating graphic processing. The AGP bus 805 is a bus that directly accesses the MEM-P 802 with high throughput to accelerate the graphics accelerator card.

The ASIC 806 is an integrated circuit (IC) for image processing having hardware elements for image processing, and serves as a bridge coupling the AGP bus 805, the PCI bus, the auxiliary storage device 808, and the MEM-C 807 with each other. The ASIC 806 includes a PCI target and an AGP master, an arbiter (ARB) serving as a core of the ASIC 806, a memory controller that controls the MEM-C 807, a plurality of direct memory access controllers (DMACs) that rotate image data using hardware logic or the like, and a PCI unit that transfers data to and from the plotter 831 and the scanner 832 via the PCI bus. For example, the FCU 820, the plotter 831, and the scanner 832 are coupled to the ASIC 806 via the PCI bus.

The MEM-C 807 is a memory used as a copy image buffer and a code buffer.

The auxiliary storage device 808 is a storage device such as a hard disk drive (HDD), a solid state drive (SSD), a secure digital (SD) card, or a flash memory, and is a storage for storing fax data and image data, programs, font data, forms, and so forth.

The hardware configuration of the MFP 10 illustrated in FIG. 2 is an example, and does not have to include all the constituent devices, and may include other constituent devices.

Configurations and Operations of Functional Blocks of MFP

Figure 3:
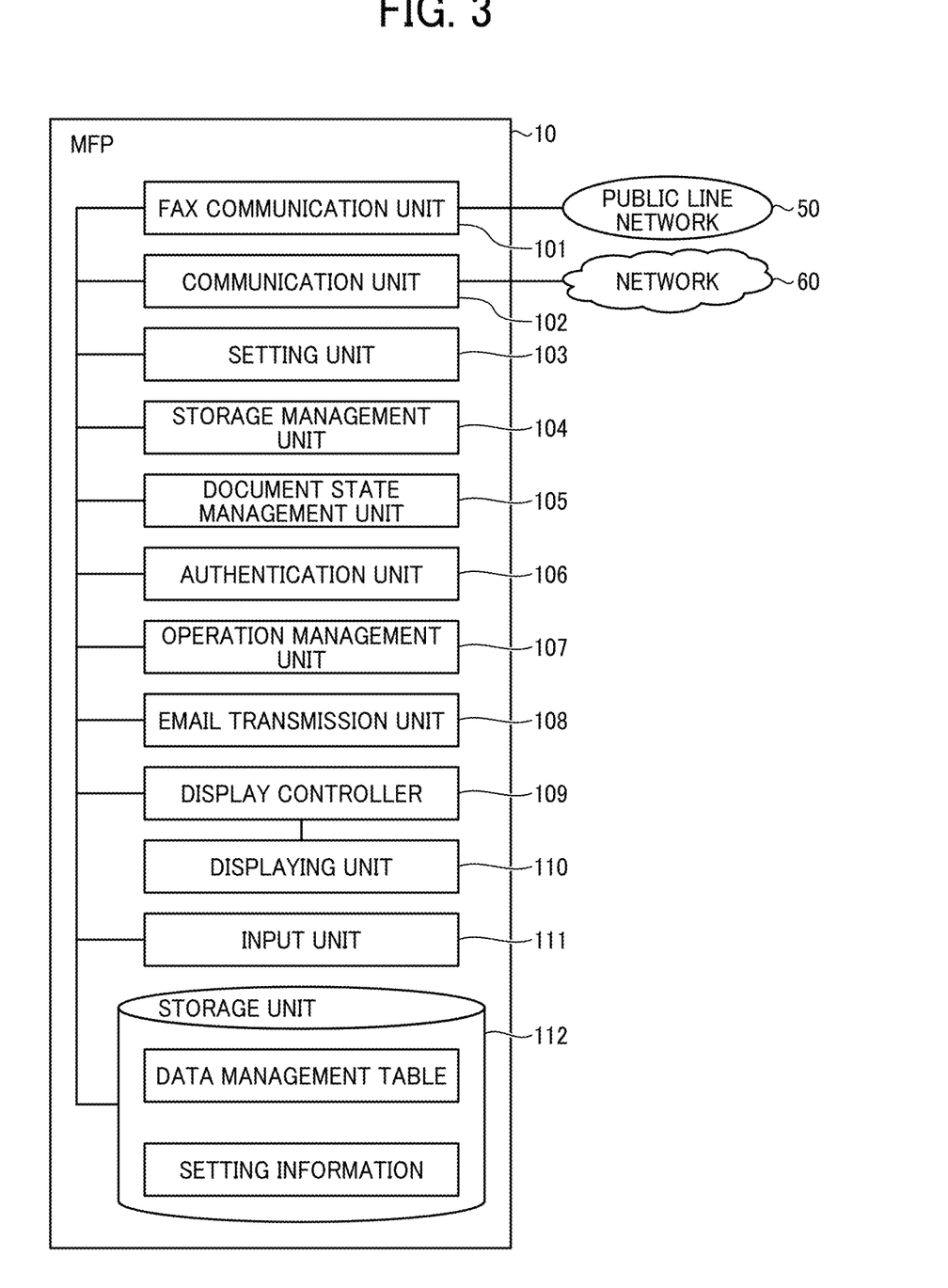
FIG. 3 is a block diagram illustrating an example of configurations of functional blocks of the MFP according to the embodiment.
Figure 4:
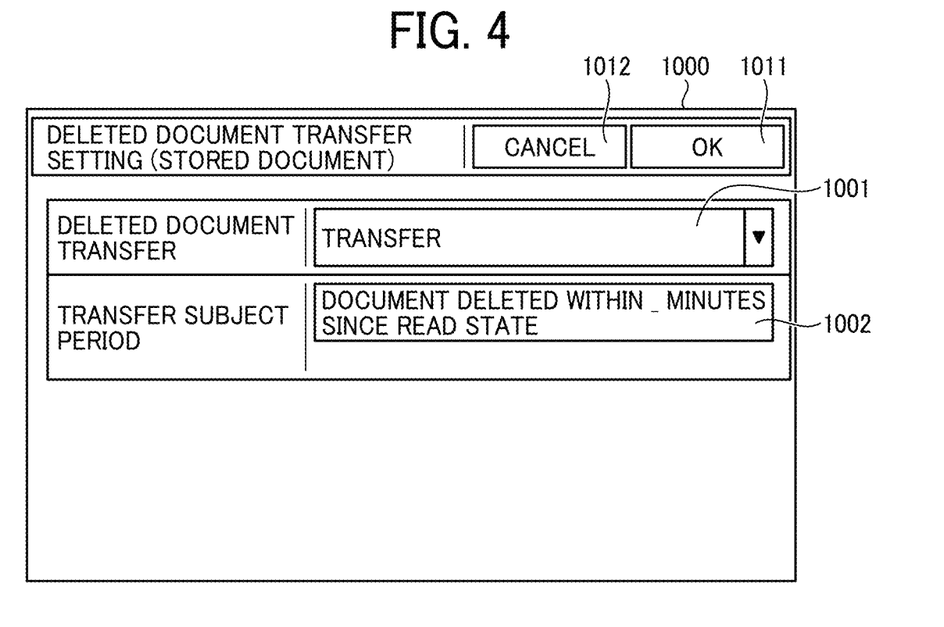
FIG. 4 illustrates an example of a deleted document transfer setting screen.
Figure 5:
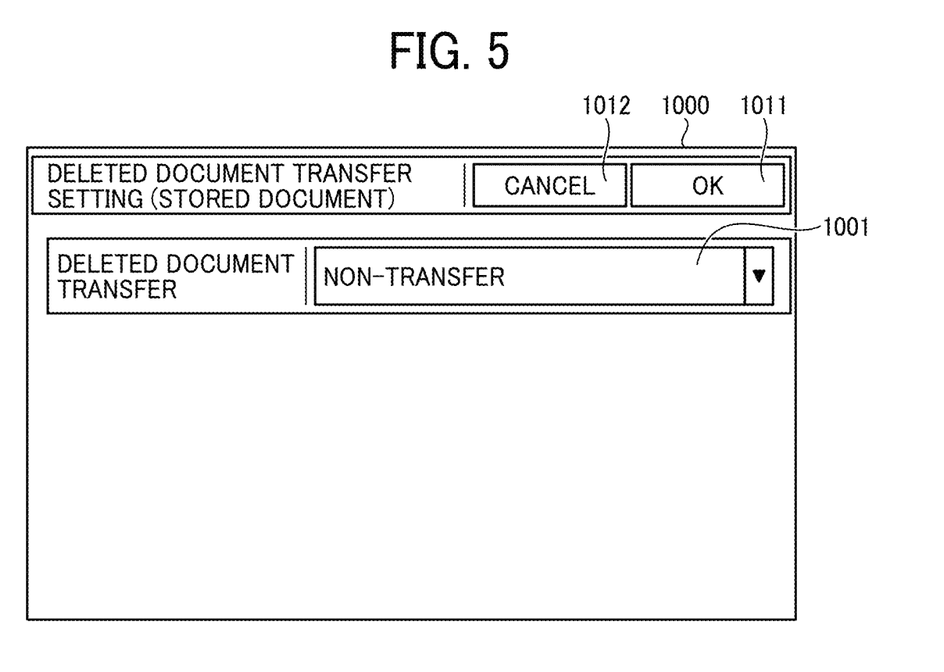
FIG. 5 illustrates an example of the deleted document transfer setting screen when setting of non-transfer is selected.
Figure 6:
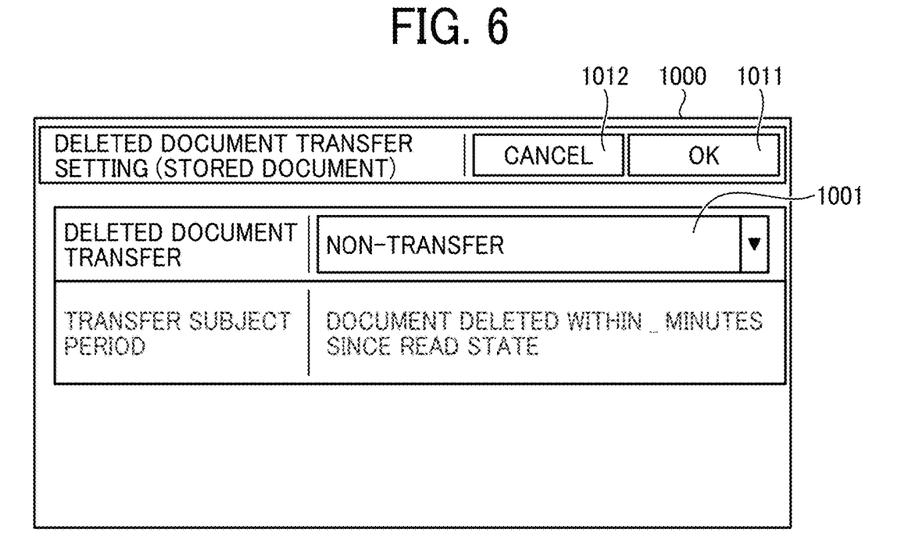
FIG. 6 illustrates another example of the deleted document transfer setting screen when the setting of non-transfer is selected.
Figure 7:
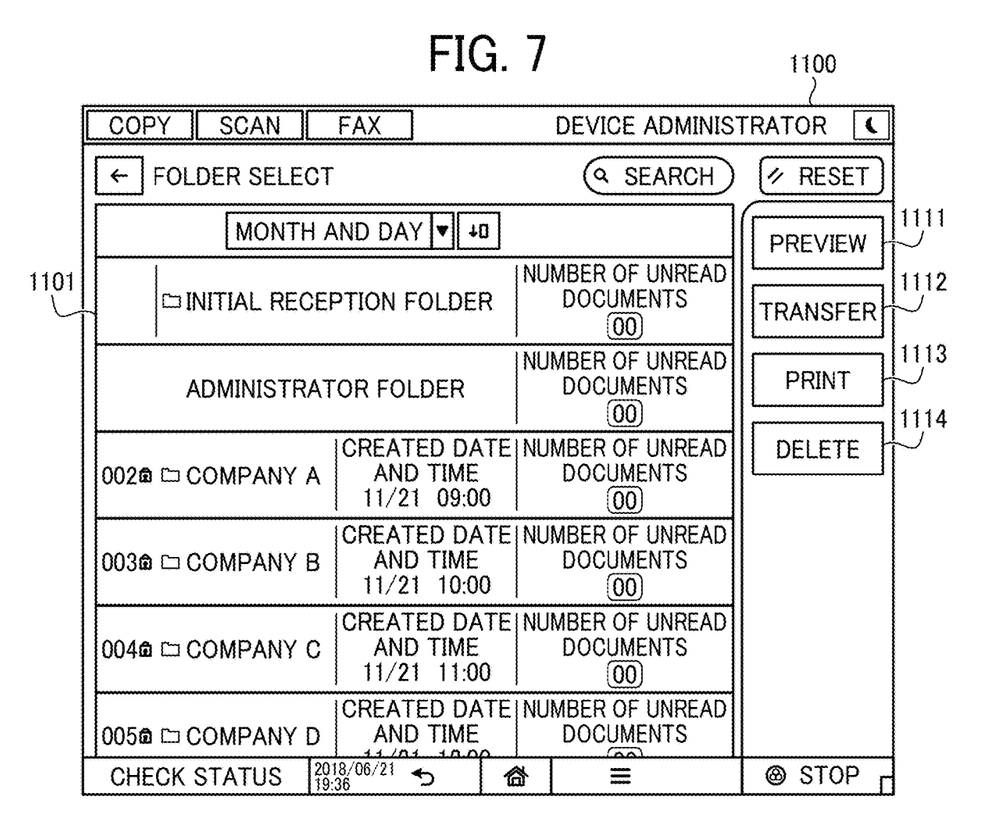
FIG. 7 illustrates an example of a storage folder management screen in which an administrator folder is displayed.
Figure 8:
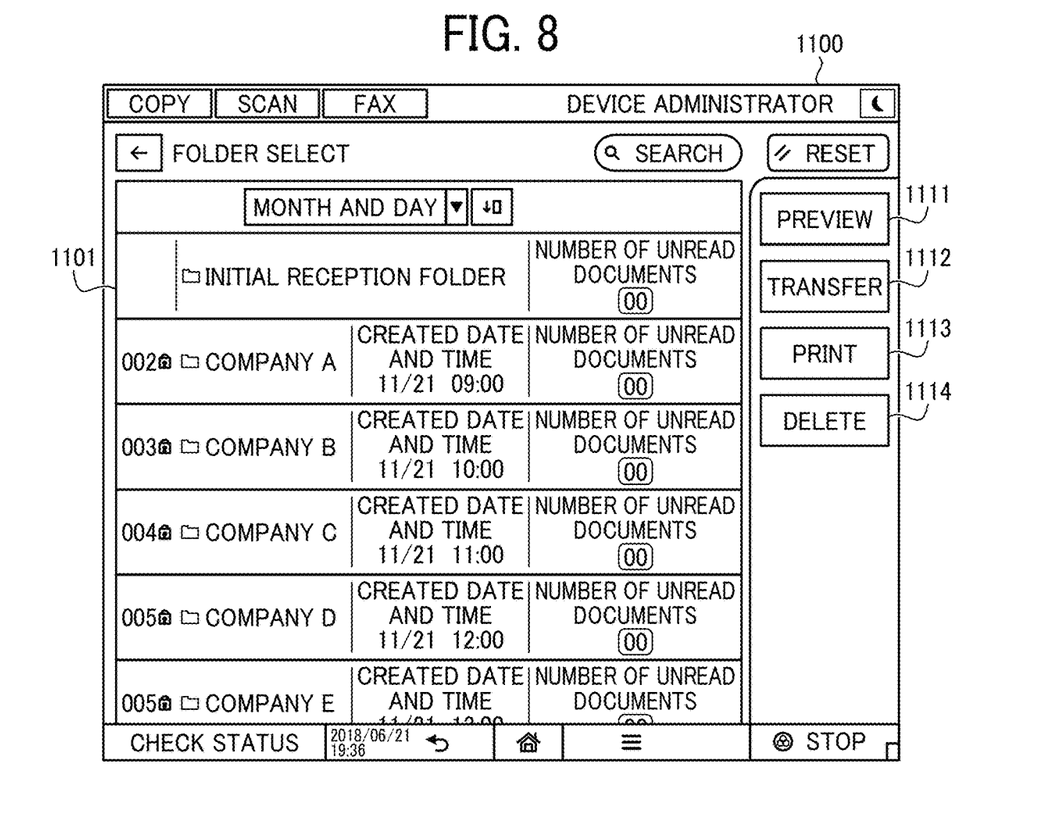
FIG. 8 illustrates an example of the storage folder management screen in which the administrator folder is not displayed.
Figure 9:
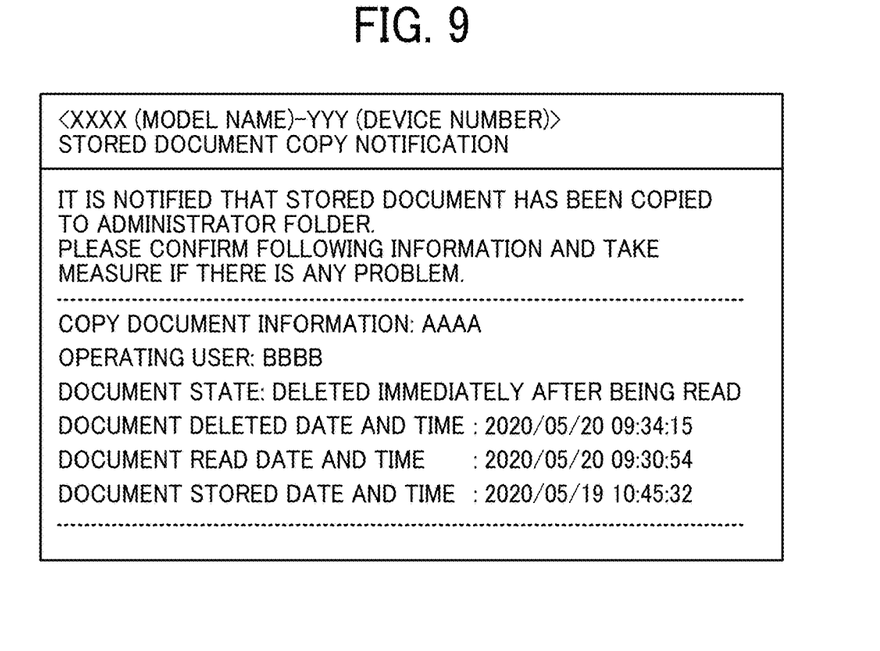
FIG. 9 illustrates an example of an email notifying that a stored document has been copied.
Figure 10:
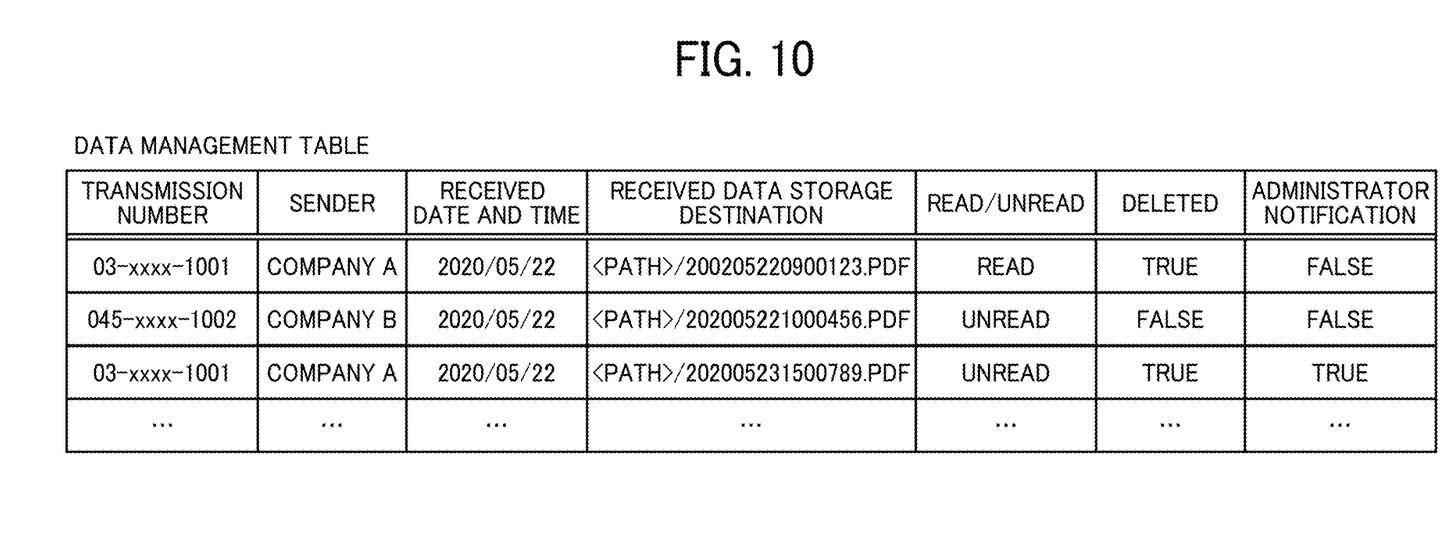
FIG. 10 is a table presenting an example of a data management table.

FIG. 3 is a block diagram illustrating an example of configurations of functional blocks of the MFP according to the embodiment. FIG. 4 illustrates an example of a deleted document transfer setting screen. FIG. 5 illustrates an example of the deleted document transfer setting screen when setting of non-transfer is selected. FIG. 6 illustrates another example of the deleted document transfer setting screen when the setting of non-transfer is selected. FIG. 7 illustrates an example of a storage folder management screen in which an administrator folder is displayed. FIG. 8 illustrates an example of the storage folder management screen in which the administrator folder is not displayed. FIG. 9 illustrates an example of an email notifying that a stored document has been copied. FIG. 10 is a table presenting an example of a data management table. The configurations of the functional blocks of the MFP 10 according to the embodiment will be described with reference to FIGS. 3 to 10.

As illustrated in FIG. 3, the MFP 10 includes a fax communication unit 101 (receiving unit), a communication unit 102, a setting unit 103, a storage management unit 104 (storage unit, second management unit), a document state management unit 105 (third management unit), an authentication unit 106, an operation management unit 107 (first management unit), an email transmission unit 108, a display controller 109, a displaying unit 110, an input unit 111, and a storage unit 112.

The fax communication unit 101 is a functional unit that performs data communication with an external device (such as the transmission source apparatus 20) via the public line network 50 and receives fax data from the external device. Further, the fax communication unit 101 extracts transmission source identification information for identifying the transmission source (for example, the fax number of the transmission source or the device name of the transmission source apparatus) from the received fax data. The fax communication unit 101 is implemented by the CPU 801 illustrated in FIG. 2 executing a program and by the FCU 820.

The communication unit 102 is a functional unit that performs data communication with an external device (such as the mail server 30) via the network 60. The communication unit 102 is implemented by the CPU 801 illustrated in FIG. 2 executing a program and by the network I/F 804b.

The setting unit 103 is a functional unit that manages and controls, for example, setting of folders (distribution destination folders) in which fax data received by the fax communication unit 101 are distributed and stored for respective transmission sources of the fax data, and setting in the deleted document transfer setting screen 1000 illustrated in FIG. 4.

The deleted document transfer setting screen 1000 illustrated in FIG. 4 is a screen displayed on the displaying unit 110 in order to set a behavior of the MFP 10 for the fax data stored in the storage unit 112 (hereinafter, occasionally referred to as "stored document") when a delete operation is performed on the stored document in an unread state, or when a delete operation is performed on the stored document within a preset period since the stored document has become a read state. The preset period may be set, for example, by the system administrator. As illustrated in FIG. 4, the deleted document transfer setting screen 1000 includes a deleted document transfer setting input unit 1001, a transfer subject period setting input unit 1002, an OK button 1011, and a cancel button 1012.

The deleted document transfer setting input unit 1001 is an input unit for setting whether to transfer a stored document to an administrator folder (an example of a specific folder) when a delete operation is performed on the stored document in the unread state, or when a delete operation is performed on the stored document within the preset period since the stored document has become the read state. The user selects and sets "transfer" (the stored document is transferred to the administrator folder) or "non-transfer" (the stored document is not transferred to the administrator folder) from the pull-down menu displayed in the deleted document transfer setting input unit 1001.

The transfer subject period setting input unit 1002 is an input unit for setting, when "transfer" has been set in the deleted document transfer setting input unit 1001, the period (minutes) since the stored document has become the read state to transfer the stored document to the administrator folder if a delete operation is performed on the stored document within the period. When the delete operation is performed on the stored document within the period set by the transfer subject period setting input unit 1002 (hereinafter, occasionally referred to as "transfer subject period") since the stored document has become the read state, it is determined that deletion by an erroneous operation or an unauthorized operation has been performed, and the stored document is copied (transferred) to the administrator folder.

The OK button 1011 is a button for confirming the content set in the deleted document transfer setting input unit 1001 and the transfer subject period setting input unit 1002. When the OK button 1011 is pressed, the setting unit 103 causes the storage unit 112 to store the content set in the deleted document transfer setting input unit 1001 and the transfer subject period setting input unit 1002 as setting information.

The cancel button 1012 is a button for cancelling the content set in the deleted document transfer setting input unit 1001 and the transfer subject period setting input unit 1002.

When "non-transfer" (the stored document is not transferred to the administrator folder) is selected in the deleted document transfer setting input unit 1001 in the deleted document transfer setting screen 1000, the setting of the transfer subject period setting input unit 1002 is no longer required. Thus, for example, as in the deleted document transfer setting screen 1000 illustrated in FIG. 5, the transfer subject period setting input unit 1002 may be hidden, and as in the deleted document transfer setting screen 1000 illustrated in FIG. 6, the transfer subject period setting input unit 1002 may be grayed out so that the setting is not allowed.

The setting unit 103 is implemented by the CPU 801 illustrated in FIG. 2 executing a program.

The storage management unit 104 is a functional unit that, when fax data is received by the fax communication unit 101, distributes and stores the fax data in a distribution destination folder of the storage unit 112 corresponding to transmission source identification information of the fax data. In this case, the storage management unit 104 registers data of the fax data (stored document) stored in the distribution destination folder in a data management table presented in FIG. 10.

The data management table presented in FIG. 10 is a table created in the storage unit 112, for managing stored documents. As illustrated in FIG. 10, the data management table manages an item "transmission number" which is the number of a transmission source of a stored document (fax data), an item "sender" which is the transmission source of the fax data, an item "received date and time" of the fax data, an item "received data storage destination" which is a storage destination of the fax data (<path> indicates a distribution destination folder), an item "read/unread" indicating a read state or an unread state, an item "deleted" indicating whether the fax data has been deleted from the distribution destination folder, and an item "administrator notification" indicating whether the fax data has been transferred to an administrator folder by a delete operation of the stored document in association with each other. When the record of the fax data received by the fax communication unit 101 is newly registered in the data management table by the storage management unit 104, the date and time of the reception is registered in the item "received date and time", "unread" is registered in the item "read/unread", "False" is registered in the item "deleted", and "False" is registered in the item "administrator notification". In addition, when a delete operation is performed on a selected stored document in the storage folder management screen 1100 illustrated in FIG. 7 (described later), the item "deleted" of the record corresponding to the stored document is changed from "False" to "True" in the data management table.

In a state where the operation management unit 107 has detected a delete operation on a stored document, and in a state where the setting unit 103 has made transfer setting (copy setting) to the administrator folder (when "transfer" has been set in the deleted document transfer setting input unit 1001 in the deleted document transfer setting screen 1000), when a delete operation is performed on the stored document in the unread state, or when a delete operation is performed on the stored document within the period set in the transfer subject period setting input unit 1002 since the stored document has become the read state, the storage management unit 104 determines that deletion by an erroneous operation or an unauthorized operation has been performed, and copies (transfers) the stored document to the administrator folder.

The storage management unit 104 is implemented by the CPU 801 illustrated in FIG. 2 executing a program.

The document state management unit 105 is a functional unit that determines whether a target stored document is unread or has been read. When a preview operation, a transfer operation, or a print operation is performed on a stored document in the storage folder management screen 1100 illustrated in FIG. 7, the document state management unit 105 changes the item "read/unread" of the record corresponding to the stored document from "unread" to "read" in the data management table presented in FIG. 10.

The storage folder management screen 1100 illustrated in FIG. 7 is a screen displayed on the displaying unit 110 for managing folders (distribution destination folders) in which fax data received by the fax communication unit 101 have been stored as stored documents for respective transmission sources. As illustrated in FIG. 7, the storage folder management screen 1100 includes a distribution destination folder list display area 1101, a preview button 1111, a transfer button 1112, a print button 1113, and a delete button 1114.

The distribution destination folder list display area 1101 is a display area for displaying an administrator folder and a list of distribution destination folders for storing fax data for respective transmission sources. In the example illustrated in FIG. 7, the distribution destination folder list display area 1101 displays an administrator folder, a "company A" folder for storing fax data received from a company A, a "company B" folder for storing fax data received from a company B, and a "company C" folder for storing fax data received from a company C. The administrator folder is a folder for an administrator having administrator authority. Specifically, the administrator folder is, when a delete operation is performed on a stored document stored in a certain distribution destination folder, for creating a copy of the stored document if it is determined that deletion by an erroneous operation or an unauthorized operation has been performed. For example, when a specific distribution destination folder in the distribution destination folder list display area 1101 is selected, a list of stored documents stored in the distribution destination folder may be displayed.

A preview button 1111 is a button for displaying a preview of a selected stored document. When the preview is displayed by pressing the preview button 1111, the document state management unit 105 changes the item "read/unread" of the record corresponding to the stored document from "unread" to "read" in the data management table presented in FIG. 10.

The transfer button 1112 is a button for transmitting a selected stored document to a predetermined email address. The predetermined email address is previously set to an administrator email address, for example. When the transfer button 1112 is pressed, the selected stored document may be transmitted to a predetermined fax destination or moved to a predetermined folder (for example, the administrator folder). When the transmission process is performed in response to pressing of the transfer button 1112, the document state management unit 105 changes the item "read/unread" of the record corresponding to the stored document from "unread" to "read" in the data management table presented in FIG. 10.

The print button 1113 is a button for printing a selected stored document. When the print process is performed in response to pressing of the print button 1113, the document state management unit 105 changes the item "read/unread" of the record corresponding to the stored document from "unread" to "read" in the data management table presented in FIG. 10.

The delete button 1114 is a button for deleting a selected stored document. When the delete process is performed in response to pressing of the delete button 1114, the storage management unit 104 changes the item "deleted" of the record corresponding to the stored document to "True" in the data management table presented in FIG. 10. Thus, the stored document is deleted from the stored document list displayed in the distribution destination folder list display area 1101.

As will be described later in detail in a stored document copy process illustrated in to FIG. 12 (described later), when a delete operation is performed on a selected stored document in the unread state, or when a delete operation is performed on a selected stored document within the preset period since the stored document has become the read state, the storage management unit 104 determines that deletion by an erroneous operation or an unauthorized operation has been performed, and the stored document is copied (transferred) to the administrator folder. In this case, the storage management unit 104 changes the item "administrator notification" of the record corresponding to the stored document to "True" in the data management table presented in FIG. 10. That is, in the data management table presented in FIG. 10, the stored document whose item "administrator notification" is "True" and item "deleted" is "True" is a stored document copied (transferred) to the administrator folder because it is determined that deletion by an erroneous operation or an unauthorized operation has been performed. In contrast, a stored document whose item "administrator notification" is "False" and item "deleted" is "True" indicates a stored document deleted by an appropriate action (operation) by the user. As described above, the data of the main body of the stored document whose item "administrator notification" is "False" and item "deleted" is "True" may be deleted immediately or in a periodic process or a nighttime process. When the data of the main body is deleted, the record corresponding to the stored document in the data management table may be deleted.

In the storage folder management screen 1100 illustrated in FIG. 7, the administrator folder is displayed in the distribution destination folder list display area 1101, which is a screen when the administrator having the administrator authority has logged in or when the administrator setting has not been made. In contrast, when the administrator setting is made and the user without the administrator authority logs in, the administrator folder may be hidden in the distribution destination folder list display area 1101 as in the storage folder management screen 1100 illustrated in FIG. 8.

Referring back to FIG. 3, the description of the document state management unit 105 will be continued. The document state management unit 105 is implemented by the CPU 801 illustrated in FIG. 2 executing a program.

The authentication unit 106 is a functional unit that controls a login authentication operation to the MFP 10 based on user management information stored in the storage unit 112, an authentication server (not illustrated), or the like. The authentication unit 106 is implemented by the CPU 801 illustrated in FIG. 2 executing a program.

The operation management unit 107 is a functional unit that detects an operation on a stored document stored in a distribution destination folder and causes the storage unit 112 to store information related to the operation. Examples of the information related to the operation include unread end time information that is a time at which an operation for bringing the stored document into the read state was performed, and document deleted time information that is a time at which a delete operation was performed on the stored document. The operation management unit 107 is implemented by the CPU 801 illustrated in FIG. 2 executing a program.

The email transmission unit 108 is a functional unit that transmits an email indicating that the stored document has been copied (transferred) to the administrator folder to the email address of the administrator via the mail server 30 when the storage management unit 104 determines that deletion by an erroneous operation or an unauthorized operation has been performed. FIG. 9 illustrates an example of the content of the email transmitted by the email transmission unit 108. As illustrated in FIG. 9, the email transmitted to the email address of the administrator by the email transmission unit 108 includes, for example, stored document information (document ID or document name) for identifying the stored document copied to the administrator folder, information on the user who performed the delete operation, document stored date and time when the stored document was stored, document read date and time when the stored document was read, and document deleted date and time when the stored document was deleted. Note that the email transmitted by the email transmission unit 108 may be attached with the stored document copied to the administrator folder. The email transmission unit 108 is implemented by the CPU 801 illustrated in FIG. 2 executing a program.

The display controller 109 is a functional unit that controls the display operation of the displaying unit 110. The display controller 109 is implemented by the CPU 801 illustrated in FIG. 2 executing a program.

The displaying unit 110 is a functional unit that displays various screens (for example, the deleted document transfer setting screen 1000 and the storage folder management screen 1100) under the control of the display controller 109. The displaying unit 110 is implemented by a display function of the operation display 810 illustrated in FIG. 2.

The input unit 111 is a functional unit that receives an operation input from a user. The input unit 111 is implemented by an input function of the operation display 810 illustrated in FIG. 2.

The storage unit 112 is a functional unit that stores various types of information such as stored documents stored for respective distribution destination folders, programs, the data management table presented in FIG. 10, information related to an operation detected by the operation management unit 107, and setting information set by the setting unit 103. The storage unit 112 is implemented by the auxiliary storage device 808 illustrated in FIG. 2.

Note that the setting unit 103, the storage management unit 104, the document state management unit 105, the authentication unit 106, the operation management unit 107, the email transmission unit 108, and the display controller 109 described above are implemented by executing a program that is software. However, there is no limitation thereto, and at least one of these functional units may be implemented by a dedicated hardware circuit (integrated circuit or the like).

In addition, each functional unit of the MFP 10 illustrated in FIG. 3 conceptually indicates a function, and is not limited to such a configuration. For example, a plurality of functional units illustrated as independent functional units in the MFP 10 illustrated in FIG. 3 may be constituted as one functional unit. In contrast, in the MFP 10 illustrated in FIG. 3, a function of one functional unit may be divided into a plurality of functions to constitute a plurality of functional units.

Stored Document Copy Process of MFP

Figure 11:
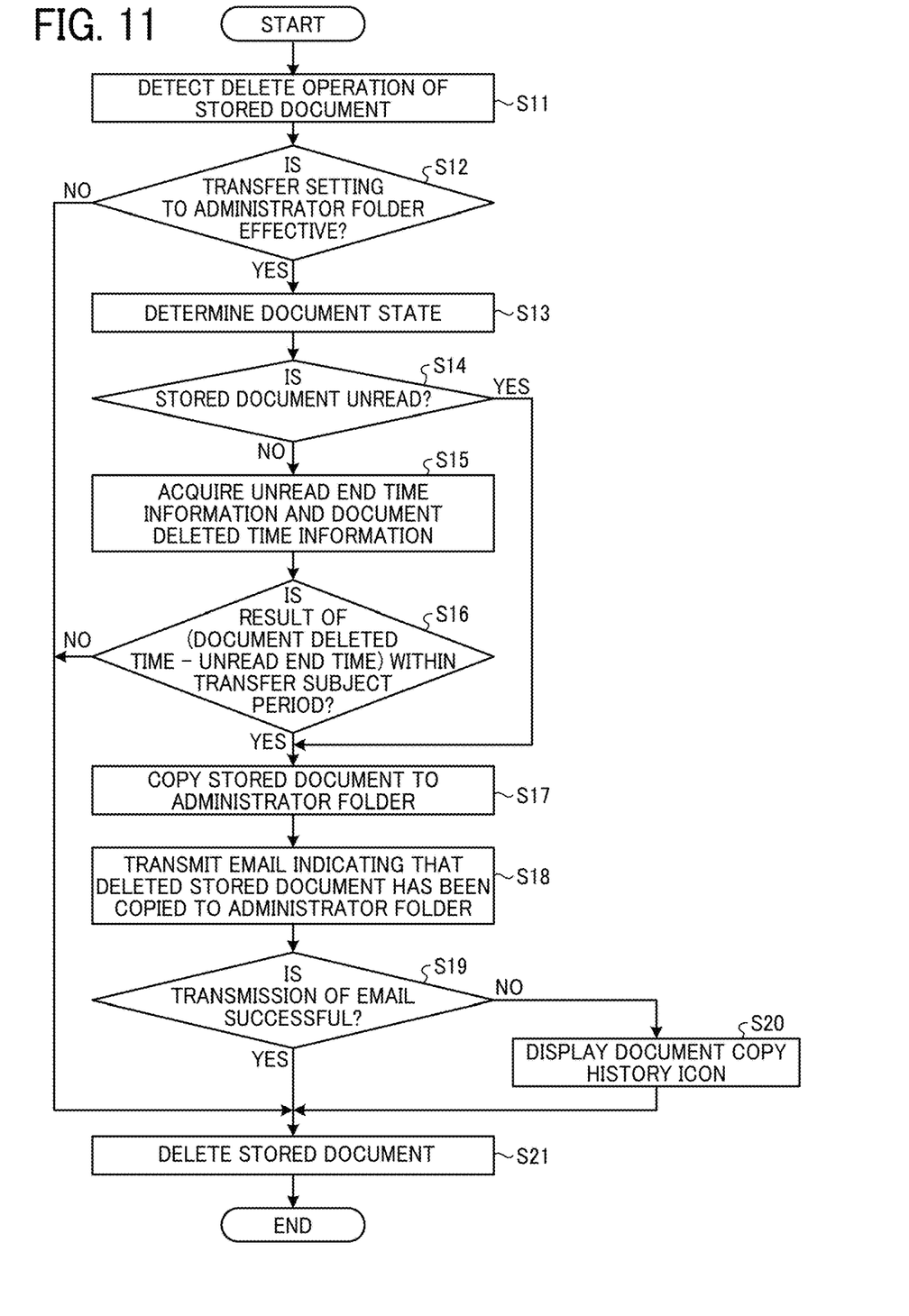
FIG. 11 is a flowchart illustrating an example of a flow of a stored document copy process in the MFP according to the present embodiment.

FIG. 11 is a flowchart illustrating an example of a flow of a stored document copy process of the MFP according to the present embodiment. FIG. 12 illustrates an example of the storage folder management screen 1100 when transmission of a notification mail fails. With reference to FIG. 11 and FIG. 12, the flow of the stored document copy process of the MFP 10 according to the present embodiment will be described.

Step S11

When a delete operation is performed on a certain stored document stored in a certain distribution destination folder via the input unit 111 of the MFP 10, the operation management unit 107 detects that the delete operation has been performed on the target document. Then, the operation management unit 107 causes the storage unit 112 to store document deleted time information indicating the time at which the delete operation was performed. The operation then proceeds to step S12.

Step S12

When the setting unit 103 has made the transfer setting to the administrator folder (step S12: Yes), the operation proceeds to step S13. When the setting unit 103 has not made the transfer setting (step S12: No), the operation proceeds to step S21.

Step S13

When the setting unit 103 has made the transfer setting to the administrator folder, the document state management unit 105 refers to the item "read/unread" of the record corresponding to the stored document in the data management table presented in FIG. 10 to determine whether the stored document is in the read state or the unread state. The operation then proceeds to step S14.

Step S14

When the document state management unit 105 determines that the stored document is in the unread state (step S14: Yes), the operation proceeds to step S17. When the document state management unit 105 determines that the stored document is in the read state (step S14: No), the operation proceeds to step S15.

Step S15

When the document state management unit 105 determines that the stored document is in the read state, the unread end time information, which is the time at which the operation of bringing the stored document into the read state was performed, is stored in the storage unit 112 by the operation management unit 107. The storage management unit 104 acquires the unread end time information corresponding to the stored document stored in the storage unit 112 and the document deleted time information stored in the storage unit 112 in step S11. The operation then proceeds to step S16.

Step S16

The storage management unit 104 determines whether the period obtained by subtracting the unread end time indicated by the unread end time information from the document deleted time indicated by the document deleted time information is within the transfer subject period. That is, the storage management unit 104 determines whether the result of (the document deleted time—the unread end time) is within the transfer subject period. When the result is within the transfer subject period (step S16: Yes), the operation proceeds to step S17, and when the result exceeds the transfer subject period (step S16: No), the operation proceeds to step S21.

Step S17

When the result of (the document deleted time—the unread end time) is within the transfer subject period, the storage management unit 104 determines that deletion by an erroneous operation or an unauthorized operation has been performed, and copies (transfers) the stored document to the administrator folder. Then, the storage management unit 104 changes the item "administrator notification" of the record corresponding to the stored document to "True" in the data management table presented in FIG. 10. The operation then proceeds to step S18.

Step S18

The email transmission unit 108 transmits an email indicating that the stored document has been copied (transferred) to the administrator folder, to the email address of the administrator via the mail server 30 when the storage management unit 104 determines that deletion by an erroneous operation or an unauthorized operation has been performed. The operation then proceeds to step S19.

Step S19

When the transmission of the email by the email transmission unit 108 is successful (step S19: Yes), the operation proceeds to step S21, and when the transmission of the email fails (step S19: No), the operation proceeds to step S20.

Step S20

Figure 12:
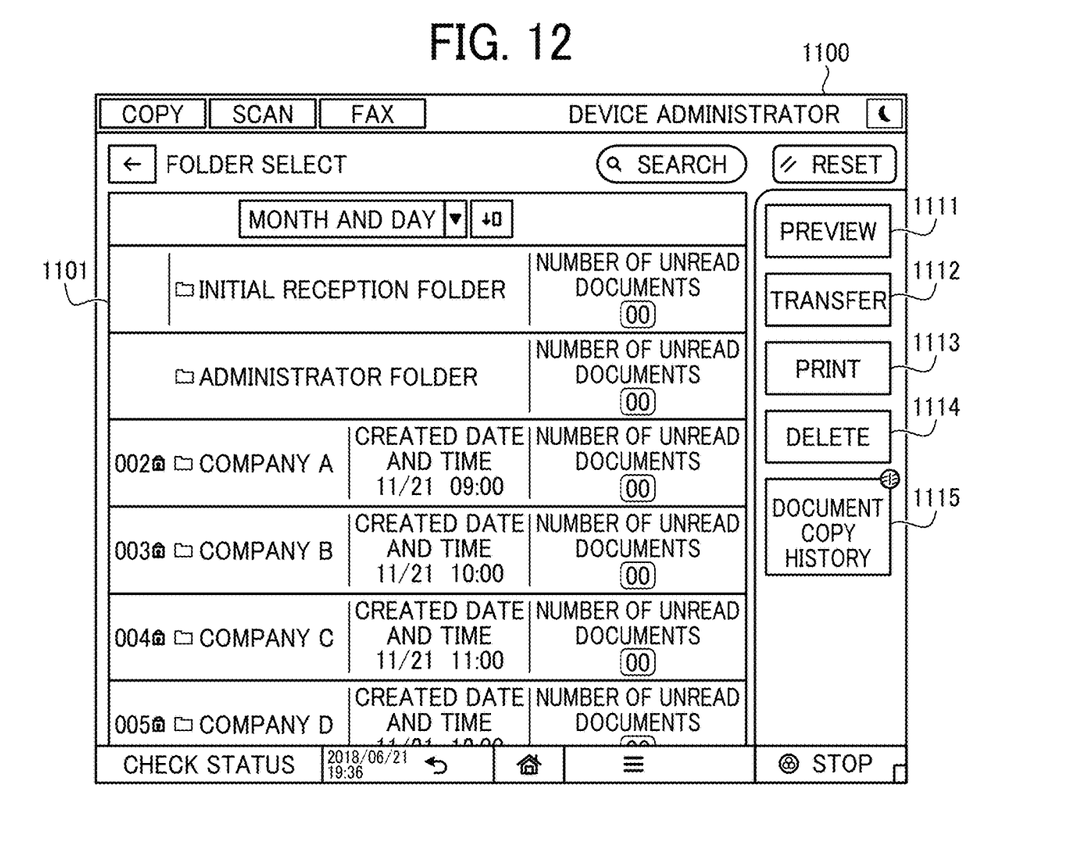
FIG. 12 illustrates an example of the storage folder management screen when transmission of the notification mail fails.

When the transmission of the email by the email transmission unit 108 fails, the display controller 109 causes the storage unit 112 to store a copy history indicating that the stored document has been copied to the administrator folder, and causes a copy history button 1115 indicating that the stored document has been copied to the administrator folder to be displayed, as in a storage folder management screen 1100 illustrated in FIG. 12. The copy history button 1115 may be displayed when the administrator logs in, and the administrator can confirm the copy history (for example, preview display of the stored document transferred to the administrator folder) by pressing the copy history button 1115. The operation then proceeds to step S21.

Step S21

Then, the storage management unit 104 deletes the stored document stored in the distribution destination folder. In this case, the storage management unit 104 changes the item "deleted" of the record corresponding to the stored document from "False" to "True" in the data management table presented in FIG. 10. The stored document copy process is thus completed.

As described above, in the MFP 10 according to the present embodiment, when a target stored document in the unread state is deleted, or when a target stored document in the read state is deleted within the transfer subject period, the storage management unit 104 determines that deletion by an erroneous operation or an unauthorized operation has been performed, and the stored document is copied (transferred) to the administrator folder and then deleted. Thus, when the stored document is deleted because deletion by an erroneous operation or an unauthorized operation is performed, the stored document is copied to the administrator folder and the administrator can confirm the stored document. Thus, it is possible to improve security against a delete operation by an erroneous operation or unauthorized use of the stored document.

In the MFP 10 according to the present embodiment, when a target stored document in the unread state is deleted, or when a target stored document in the read state is deleted within the transfer subject period, the stored document is copied to the administrator folder, and the email transmission unit 108 transmits an email indicating that the stored document has been copied (transferred) to the administrator folder to the email address of the administrator when it is determined that the stored document has been deleted by an erroneous operation or has been subjected to an unauthorized operation. Thus, the administrator can recognize that the stored document has been deleted by an erroneous operation or has been subjected to an unauthorized operation, and can take measures against the recognized situation.

Each of the functions of the above-described embodiment may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field-programmable gate array (FPGA), a system on a chip (SOC), a graphics processing unit (GPU), and conventional circuit components arranged to perform the recited functions.

In addition, in the above-described embodiment, when at least one of the functional units of the MFP 10 is implemented by executing a program, the program is provided by being incorporated in advance in a ROM or the like. The program to be executed by the MFP 10 according to the above-described embodiment may be provided by being recorded in a computer-readable storage medium (recording medium) such as a compact disc read-only memory (CD-ROM), a flexible disk (FD), a compact disc recordable (CD-R), a digital versatile disc (DVD), or a secure digital (SD) card in a file of an installable format or an executable format. Further, the program executed by the MFP 10 according to the embodiment may be stored on a computer connected to a network such as the Internet and downloaded via the network. Furthermore, the program executed by the MFP 10 according to the embodiment may be provided or distributed via a network such as the Internet. The program executed in the MFP 10 according to the above-described embodiment has a module configuration including at least one of the above-described functional units. As actual hardware, the CPU reads a program from the above-described storage device and executes the program, whereby the above-described functional units are loaded onto the main storage device and generated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An information processing apparatus comprising:
   circuitry configured to
   receive fax data,
   store, in a memory, the fax data as a stored document in a distribution destination folder corresponding to the fax data, among one or more distribution destination folders created for respective one or more transmission sources,
   in response to detection of a delete operation performed on the stored document, determine a state of the stored document to generate a first determination result,
   when the first determination result indicates that the stored document is in a read state, determine whether a period from a time at which the stored document was read to a time at which the delete operation was performed is within a preset period to generate a second determination result, and
   when the first determination result indicates that the stored document is in an unread state, or when the second determination result indicates that the period from the time at which the stored document was read to the time at which the delete operation was performed is within the preset period, copy the stored document to a specific folder and delete the stored document.

2. The information processing apparatus according to claim 1,
   wherein the circuitry is configured to,
   when the stored document is copied to the specific folder, transmit an email indicating that the stored document has been copied to the specific folder, to a predetermined email address.

3. The information processing apparatus according to claim 2,
   wherein the circuitry is configured to
   display a copy history indicating that the stored document has been copied to the specific folder, on a display when the transmission of the email has failed.

4. The information processing apparatus according to claim 1,
   wherein the circuitry is configured to
   set whether to make copy setting for copying the stored document to the specific folder in accordance with an input operation, and
   copy the stored document to the specific folder when the copy setting has been made.

5. The information processing apparatus according to claim 4,
   wherein the circuitry is configured to set a subject period in accordance with the input operation.

6. The information processing apparatus according to claim 1,
   wherein the circuitry is configured to
   change the stored document from the unread state to the read state when at least one of a preview operation, an email transfer operation, or a print operation is performed on the stored document.

7. An information processing method comprising:
   receiving fax data;
   storing, in a memory, the fax data as a stored document in a distribution destination folder corresponding to the fax data, among one or more distribution destination folders created for respective one or more transmission sources;
   detecting a delete operation performed on the stored document;

in response to the detection of the delete operation, determining a state of the stored document to generate a first determination result;

when the first determination result indicates that the stored document is in a read state, determining whether a period from a time at which the stored document was read to a time at which the delete operation was performed is within a preset period to generate a second determination result; and when the first determination result indicates that the stored document is in an unread state, or when the second determination result indicates that the period from the time at which the stored document was read to the time at which the delete operation was performed is within the preset period, copying the stored document to a specific folder and deleting the stored document.

8. A non-transitory recording medium storing a plurality of instructions which, when executed by one or more processors, causes the processors to perform an information processing method comprising:

receiving fax data;

storing, in a memory, the fax data as a stored document in a distribution destination folder corresponding to the fax data among one or more distribution destination folders created for respective one or more transmission sources;

detecting a delete operation performed on the stored document;

in response to the detection of the delete operation, determining a state of the stored document to generate a first determination result;

when the first determination result indicates that the stored document is in a read state, determining whether a period from a time at which the stored document was read to a time at which the delete operation was performed is within a preset period to generate a second determination result; and when the first determination result indicates that the stored document is in an unread state, or when the second determination result indicates that the period from the time at which the stored document was read to the time at which the delete operation was performed is within the preset period, copying the stored document to a specific folder and deleting the stored document.

* * * * *